US010235532B2

(12) United States Patent
Scholz

(10) Patent No.: US 10,235,532 B2
(45) Date of Patent: Mar. 19, 2019

(54) DEVICE ACCESS CONTROL

(71) Applicant: Harman International Industries, Incorporated, Stamford, CT (US)

(72) Inventor: Jens Scholz, Ehingen (DE)

(73) Assignee: Harman International Industries, Incorporated, Stamford, CT (US)

( * ) Notice: Subject to any disclaimer, the term of this patent is extended or adjusted under 35 U.S.C. 154(b) by 165 days.

(21) Appl. No.: 15/275,095

(22) Filed: Sep. 23, 2016

(65) Prior Publication Data
US 2018/0089453 A1 Mar. 29, 2018

(51) Int. Cl.
G06F 21/00 (2013.01)
G06F 21/62 (2013.01)
G06F 21/31 (2013.01)
G06F 21/36 (2013.01)

(52) U.S. Cl.
CPC .......... *G06F 21/6218* (2013.01); *G06F 21/31* (2013.01); *G06F 21/36* (2013.01)

(58) Field of Classification Search
CPC ....... G06F 21/6218; G06F 21/36; G06F 21/31
See application file for complete search history.

(56) References Cited

U.S. PATENT DOCUMENTS

| 5,428,349 | A | * | 6/1995 | Baker | .................. | G06Q 20/382 |
| | | | | | | 235/382.5 |
| 5,559,961 | A | * | 9/1996 | Blonder | .................. | G06F 21/36 |
| | | | | | | 726/18 |
| 7,653,931 | B1 | * | 1/2010 | Peterson | .................. | G06F 21/36 |
| | | | | | | 726/2 |
| 8,086,745 | B2 | * | 12/2011 | Liew | ....................... | G06F 21/36 |
| | | | | | | 709/229 |
| 8,117,458 | B2 | * | 2/2012 | Osborn, III | ............. | G06F 21/36 |
| | | | | | | 713/183 |
| 8,286,103 | B2 | * | 10/2012 | Chaudhri | ............ | G06F 3/04883 |
| | | | | | | 715/863 |
| 8,311,530 | B2 | * | 11/2012 | Kornilovsky | ......... | G06F 3/0362 |
| | | | | | | 345/173 |

(Continued)

FOREIGN PATENT DOCUMENTS

WO 2014165948 A1 10/2014

OTHER PUBLICATIONS

Roth, V. et al., "A PIN-Entry Method Resilient Against Shoulder Surfing," Proceedings of the 11th ACM Conference on Computer and Communications, Oct. 25, 2004, Washington, DC, USA, 10 pages.

(Continued)

*Primary Examiner* — David Garcia Cervetti
(74) *Attorney, Agent, or Firm* — McCoy Russell LLP

(57) ABSTRACT

Examples are provided for device access control. In one example, a computing device to which access is controlled includes a display device for presenting a user interface, a processor, and a storage device storing instructions executable by the processor to, for each of a threshold number of rounds, display a plurality of candidate regions, each candidate region including a plurality of candidate authentication objects, and receive input indicating a device access control response. After performing the threshold number of rounds, the device may selectively allow access based on a number of rounds that included a successful input (e.g., selecting a candidate region that includes an object from an access code).

20 Claims, 9 Drawing Sheets

(56) References Cited

U.S. PATENT DOCUMENTS

| | | | | |
|---|---|---|---|---|
| 8,347,103 B2* | 1/2013 | Jones | | H04L 9/3226 713/183 |
| 8,577,807 B2* | 11/2013 | Kokumai | | G06F 21/31 705/50 |
| 8,694,791 B1* | 4/2014 | Rohrweck | | G06F 21/36 455/418 |
| 9,275,214 B2* | 3/2016 | Gargaro | | G06F 21/36 |
| 9,582,181 B2* | 2/2017 | Yoon | | G06F 21/36 |
| 9,589,126 B2* | 3/2017 | Gajewski | | G06F 21/36 |
| 9,659,167 B2* | 5/2017 | Lee | | G06F 21/83 |
| 9,792,423 B2* | 10/2017 | Leddy | | G06F 21/36 |
| 9,858,432 B2* | 1/2018 | Dai Zovi | | G06F 21/6209 |
| 9,881,148 B2* | 1/2018 | Hagiwara | | G06F 21/44 |
| 9,953,152 B2* | 4/2018 | Fadell | | G06F 21/316 |
| 2005/0162407 A1* | 7/2005 | Sakurai | | G06F 21/36 345/173 |
| 2006/0206717 A1* | 9/2006 | Holt | | G06F 21/36 713/182 |
| 2008/0216163 A1* | 9/2008 | Pratte | | G06F 21/316 726/7 |
| 2010/0017875 A1* | 1/2010 | Hirakawa | | G06F 21/36 726/19 |
| 2011/0202981 A1* | 8/2011 | Tamai | | G06F 21/10 726/6 |
| 2011/0208716 A1* | 8/2011 | Liu | | G06F 17/30247 707/710 |
| 2011/0321125 A1* | 12/2011 | Kyohgoku | | G06F 21/00 726/2 |
| 2013/0094770 A1* | 4/2013 | Lee | | G06F 21/36 382/218 |
| 2013/0139226 A1* | 5/2013 | Welsch | | G06F 21/30 726/4 |
| 2013/0139248 A1* | 5/2013 | Rhee | | G06F 3/0346 726/19 |
| 2014/0125574 A1* | 5/2014 | Scavezze | | G06F 21/31 345/156 |
| 2014/0157381 A1* | 6/2014 | Disraeli | | G06F 21/31 726/7 |
| 2015/0054536 A1* | 2/2015 | Rackley | | G01R 31/2887 324/750.18 |
| 2016/0018984 A1* | 1/2016 | Choi | | G06F 21/629 715/716 |
| 2016/0125181 A1* | 5/2016 | Dai Zovi | | G06F 21/36 726/19 |
| 2016/0125193 A1* | 5/2016 | Dai Zovi | | G06F 21/6209 726/28 |
| 2016/0253488 A1* | 9/2016 | Zheng | | G06F 21/31 726/19 |
| 2016/0328141 A1* | 11/2016 | Fan | | G06F 3/04886 |
| 2016/0349986 A1* | 12/2016 | Itou | | G06F 3/04883 |

OTHER PUBLICATIONS

European Patent Office, Extended European Search Report Issued in Application No. 17188554.4, dated Feb. 6, 2018, Germany, 8 pages.

* cited by examiner

DEVICE ACCESS CONTROL

FIELD

The disclosure relates to authentication techniques for controlling access to an electronic device.

BACKGROUND

An electronic device may be configured to be "locked" when not in use to prevent unauthorized access to the device, avoid accidental activation/operation of the device, and/or otherwise control functionality of the device. A user may "unlock" the device by providing an authentication input, such as an access code or a biometric scan.

SUMMARY

Typically, authentication inputs sacrifice user friendliness (e.g., easy to input, easy to remember, etc.) for security level, or vice versa. For example, a fingerprint scan may be secure and require little memory recall from the user, but may frequently fail unless a user exactly replicates the position of his/her finger on the scanner each time the input is applied and ensures that the scanner and finger are each free of debris. Biometric scans also require additional hardware that may not be available for a given device.

User-input access codes may be utilized to leverage a device's existing hardware and may be less prone to input error than biometric scans. However, while a long access code is likely more secure (e.g., harder to crack via brute force techniques or harder to guess) than a short access code, the long code may be harder to remember and harder to input than the short code. Furthermore, access codes may be entered in the presence of other individuals, who may memorize the access code as the code is being entered, thereby reducing the code's security. Embodiments are disclosed for an example computing device to which access is controlled by a device access code including a plurality of device access code objects, the computing device comprising a display device for presenting a user interface, a processor, and a storage device storing instructions executable by the processor to, for each of a threshold number of rounds, display a plurality of candidate regions on the user interface, each candidate region including a plurality of candidate authentication objects, and receive input indicating a device access control response. If the input includes selection of a first candidate region of the plurality of candidate regions, the instructions are executable to determine that the input is a successful input responsive to determining that the first candidate region includes one of the plurality of device access code objects. After performing the threshold number of rounds, the instructions are further executable to selectively allow access to the device based on a number of rounds that included a successful input.

Embodiments are also disclosed for an example method of controlling access to a computing device using a device access control code including a plurality of device access code objects. The example method includes, for each of a plurality of rounds, displaying a plurality of candidate regions on the user interface, each candidate region including a plurality of candidate authentication objects, receiving input indicating a device access control response, the input including selection of one or more of a candidate region and user interface object representing none of the candidate regions, if the input includes selection of a first candidate region of the plurality of candidate regions, determining that the input is a successful input responsive to determining that the first candidate region includes one of the plurality of device access code objects, and, if the input includes selection of the user interface object representing none of the candidate regions, determining that the input is a successful input responsive to determining that none of the plurality of candidate regions includes one of the plurality of device access code objects, and, after performing the threshold number of rounds, selectively allowing access to the device based on a number of rounds that included a successful input.

Embodiments are also disclosed for an example computing device to which access is controlled by a device access code including a plurality of device access code objects. The example computing device includes a display device for presenting a user interface, a processor, and a storage device storing instructions executable by the processor to, for each of a threshold number of rounds, display a plurality of candidate regions on the user interface, each candidate region including a plurality of candidate authentication objects, and receive input indicating a device access control response, the input including selection of one or more of a candidate region and user interface object representing none of the candidate regions. In the example computing device, if the input includes selection of a first candidate region of the plurality of candidate regions: determine that the input is a successful input responsive to determining that the first candidate region includes one of the plurality of device access code objects, and otherwise determine that the input is an unsuccessful input, and if the input includes selection of the user interface object representing none of the candidate regions: determine that the input is a successful input responsive to determining that none of the plurality of candidate regions includes one of the plurality of device access code objects, and otherwise determine that the input is an unsuccessful input. The example computing device further includes instructions executable to adjust one or more device access control routine settings responsive to determining that the input is an unsuccessful input, and, after performing the threshold number of rounds, selectively allow access to the device based on a number of rounds that included a successful input.

BRIEF DESCRIPTION OF THE DRAWINGS

The disclosure may be better understood from reading the following description of non-limiting embodiments, with reference to the attached drawings, wherein below.

DETAILED DESCRIPTION

Figure 1:
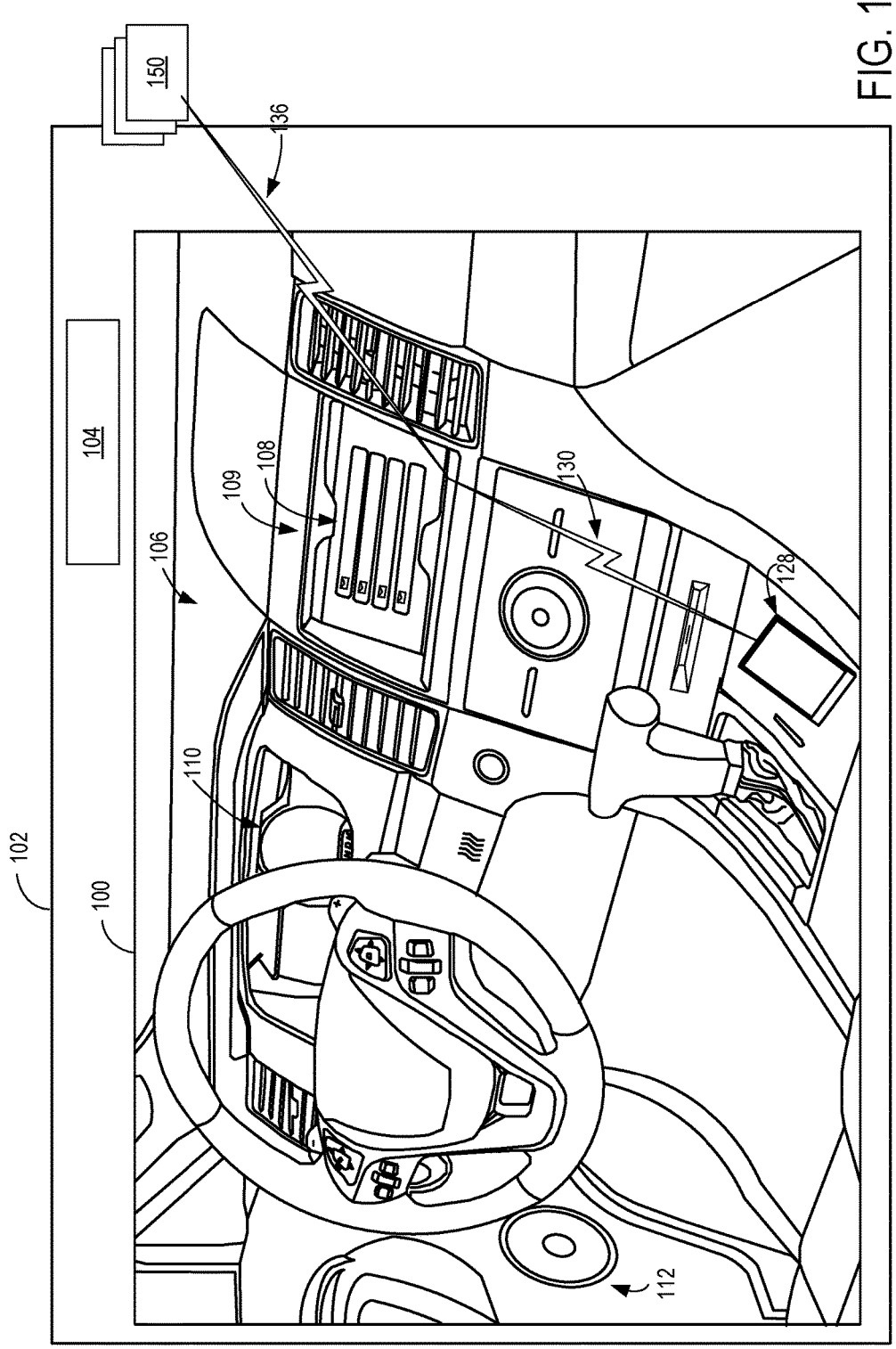
FIG. 1 shows an example partial view of a vehicle cabin in accordance with one or more embodiments of the present disclosure.

As described above, device access control schemes that involve user input and/or selection of an access code may be difficult to use (e.g., when the access code is long) and/or subject to security breaches (e.g., when the access code is short and/or able to be viewed by other individuals). Such issues may be present when the user input is received at a variety of devices, including mobile devices and vehicle-integrated devices (e.g., an in-vehicle computing system). For example, a user may not wish to delay driving for a long period of time while entering an access code, and the positioning of a display in an in-vehicle computing system may be visible by all or most of the passengers of the vehicle. In order to address the above-described issues, the subject application provides example device access control schemes that include presenting multiple selectable objects on a display and receiving selection of one or more of the selectable objects or a "not present" option. If at least one of the multiple selectable objects are included in a list of access objects previously selected by or assigned to a user (e.g., an access code of the user), the device access control may determine whether the received selections are present in the list of access objects, and authenticate and/or authorize the user (e.g., allow the user access to the device) if the received selections are present in the list. If none of the displayed selectable objects are included in the list of access objects for the user, the device access control may determine whether the received selection corresponds to the "not present" option, and authenticate and/or authorize the user if the user selected the "not present" option. Otherwise, if a user selects an object that is not included in the list of access objects for the user or selects the "not present" option when a selectable object that is included in the list of access objects for the user is displayed, the user may not be authenticated and/or authorized. For example, the user may not be allowed to access the device and/or may be prompted to perform another device access control routine The device access control described above may be performed for a variety of secured computing devices. FIG. 1 shows an example partial view of one type of environment for a computing device with device access control: an interior of a cabin 100 of a vehicle 102, in which a driver and/or one or more passengers may be seated. Vehicle 102 of FIG. 1 may be a motor vehicle including drive wheels (not shown) and an internal combustion engine 104. Vehicle 102 may be a leading vehicle or a trailing vehicle. Internal combustion engine 104 may include one or more combustion chambers which may receive intake air via an intake passage and exhaust combustion gases via an exhaust passage. Vehicle 102 may be a road automobile, among other types of vehicles. In some examples, vehicle 102 may include a hybrid propulsion system including an energy conversion device operable to absorb energy from vehicle motion and/or the engine and convert the absorbed energy to an energy form suitable for storage by an energy storage device. Vehicle 102 may include a fully electric vehicle, incorporating fuel cells, solar energy capturing elements, and/or other energy storage systems for powering the vehicle.

As shown, an instrument panel 106 may include various displays and controls accessible to a driver (also referred to as the user) of vehicle 102. For example, instrument panel 106 may include a touch screen 108 of an in-vehicle computing system 109 (e.g., an infotainment system), an audio system control panel, and an instrument cluster 110. While the example system shown in FIG. 1 includes audio system controls that may be performed via a user interface of in-vehicle computing system 109, such as touch screen 108 without a separate audio system control panel, in other embodiments, the vehicle may include an audio system control panel, which may include controls for a conventional vehicle audio system such as a radio, compact disc player, MP3 player, etc. The audio system controls may include features for controlling one or more aspects of audio output via speakers 112 of a vehicle speaker system. For example, the in-vehicle computing system or the audio system controls may control a volume of audio output, a distribution of sound among the individual speakers of the vehicle speaker system, an equalization of audio signals, and/or any other aspect of the audio output. In further examples, in-vehicle computing system 109 may adjust a radio station selection, a playlist selection, a source of audio input (e.g., from radio or CD or MP3), etc., based on user input received directly via touch screen 108, or based on data regarding the user (such as a physical state and/or environment of the user) received via external devices 150 and/or mobile device 128.

In some embodiments, one or more hardware elements of in-vehicle computing system 109, such as touch screen 108, a display screen, various control dials, knobs and buttons, memory, processor(s), and any interface elements (e.g., connectors or ports) may form an integrated head unit that is installed in instrument panel 106 of the vehicle. The head unit may be fixedly or removably attached in instrument panel 106. In additional or alternative embodiments, one or more hardware elements of the in-vehicle computing system may be modular and may be installed in multiple locations of the vehicle.

The cabin 100 may include one or more sensors for monitoring the vehicle, the user, and/or the environment. For example, the cabin 100 may include one or more seat-mounted pressure sensors configured to measure the pressure applied to the seat to determine the presence of a user, door sensors configured to monitor door activity, humidity sensors to measure the humidity content of the cabin, microphones to receive user input in the form of voice commands, to enable a user to conduct telephone calls, and/or to measure ambient noise in the cabin 100, etc. It is to be understood that the above-described sensors and/or one or more additional or alternative sensors may be positioned in any suitable location of the vehicle. For example, sensors may be positioned in an engine compartment, on an external surface of the vehicle, and/or in other suitable locations for providing information regarding the operation of the vehicle, ambient conditions of the vehicle, a user of the vehicle, etc. Information regarding ambient conditions of the vehicle, vehicle status, or vehicle driver may also be received from sensors external to/separate from the vehicle (that is, not part of the vehicle system), such as sensors coupled to external devices 150 and/or mobile device 128. User input may be received via and/or interpreted differently based on signals received from one or more of the above-described sensors.

Cabin 100 may also include one or more user objects, such as mobile device 128, that are stored in the vehicle before, during, and/or after travelling. The mobile device 128 may include a smart phone, a tablet, a laptop computer, a portable media player, and/or any suitable mobile computing device. The mobile device 128 may be connected to the in-vehicle computing system via communication link 130. The communication link 130 may be wired (e.g., via Universal Serial Bus [USB], Mobile High-Definition Link [MHL], High-Definition Multimedia Interface [HDMI], Ethernet, etc.) or wireless (e.g., via BLUETOOTH, WIFI, WIFI direct Near-Field Communication [NFC], cellular connectivity, etc.) and configured to provide two-way communication between the mobile device and the in-vehicle computing system. The mobile device 128 may include one or more wireless communication interfaces for connecting to one or more communication links (e.g., one or more of the example communication links described above). The wireless communication interface may include one or more physical devices, such as antenna(s) or port(s) coupled to data lines for carrying transmitted or received data, as well as one or more modules/drivers for operating the physical devices in accordance with other devices in the mobile device. For example, the communication link 130 may provide sensor and/or control signals from various vehicle systems (such as vehicle audio system, climate control system, etc.) and the touch screen 108 to the mobile device 128 and may provide control and/or display signals from the mobile device 128 to the in-vehicle systems and the touch screen 108. The communication link 130 may also provide power to the mobile device 128 from an in-vehicle power source in order to charge an internal battery of the mobile device.

In-vehicle computing system 109 may also be communicatively coupled to additional devices operated and/or accessed by the user but located external to vehicle 102, such as one or more external devices 150. In the depicted embodiment, external devices are located outside of vehicle 102 though it will be appreciated that in alternate embodiments, external devices may be located inside cabin 100. The external devices may include a server computing system, personal computing system, portable electronic device, electronic wrist band, electronic head band, portable music player, electronic activity tracking device, pedometer, smartwatch, GPS system, etc. External devices 150 may be connected to the in-vehicle computing system via communication link 136 which may be wired or wireless, as discussed with reference to communication link 130, and configured to provide two-way communication between the external devices and the in-vehicle computing system. For example, external devices 150 may include one or more sensors and communication link 136 may transmit sensor output from external devices 150 to in-vehicle computing system 109 and touch screen 108. External devices 150 may also store and/or receive information regarding contextual data, user behavior/preferences, operating rules, etc. and may transmit such information from the external devices 150 to in-vehicle computing system 109 and touch screen 108.

In-vehicle computing system 109 may analyze the input received from external devices 150, mobile device 128, and/or other input sources and select settings for various in-vehicle systems (such as climate control system or audio system), provide output via touch screen 108 and/or speakers 112, communicate with mobile device 128 and/or external devices 150, and/or perform other actions based on the assessment. In some embodiments, all or a portion of the assessment may be performed by the mobile device 128 and/or the external devices 150. In some embodiments, the external devices 150 may include in-vehicle computing devices of another vehicle.

In some embodiments, one or more of the external devices 150 may be communicatively coupled to in-vehicle computing system 109 indirectly, via mobile device 128 and/or another of the external devices 150. For example, communication link 136 may communicatively couple external devices 150 to mobile device 128 such that output from external devices 150 is relayed to mobile device 128. Data received from external devices 150 may then be aggregated at mobile device 128 with data collected by mobile device 128, the aggregated data then transmitted to in-vehicle computing system 109 and touch screen 108 via communication link 130. Similar data aggregation may occur at a server system and then transmitted to in-vehicle computing system 109 and touch screen 108 via communication link 136/130. The aggregated data may be used to provide input to a device for accessing the device and/or to otherwise control one or more devices or vehicle systems.

In the above-described example environment, any of the devices that receive user input may be configured to selectively allow access (e.g., accept control input in addition to the input for a device access control routine) based on the outcome of the device access control routine. For example, a user may provide input to the in-vehicle computing system 109 (e.g., via touch screen 108 and/or via voice input) to authorize the user to provide further input to the in-vehicle computing system (e.g., input to control the in-vehicle computing system to perform additional tasks other than authentication or device access routines) and/or to control vehicle systems in communication with the in-vehicle computing system. In an additional or alternative example, a user may provide input to the mobile device 128 to authorize the user to provide further input to the mobile device (e.g., input to control the mobile device to perform additional tasks other than authentication or device access routines). In still further examples, a user may provide input to a device (e.g., the in-vehicle computing system 109 and/or the mobile device 128) to authorize the user to provide further input to a different device (e.g., the mobile device 128 and/or the in-vehicle computing system 109). In any of the above examples, the user may be granted access to a device based on user selection of displayable objects. An example user interface for a device access control that may be displayed by one or more of the above-described devices is illustrated in FIG. 2A.

Figure 2A:
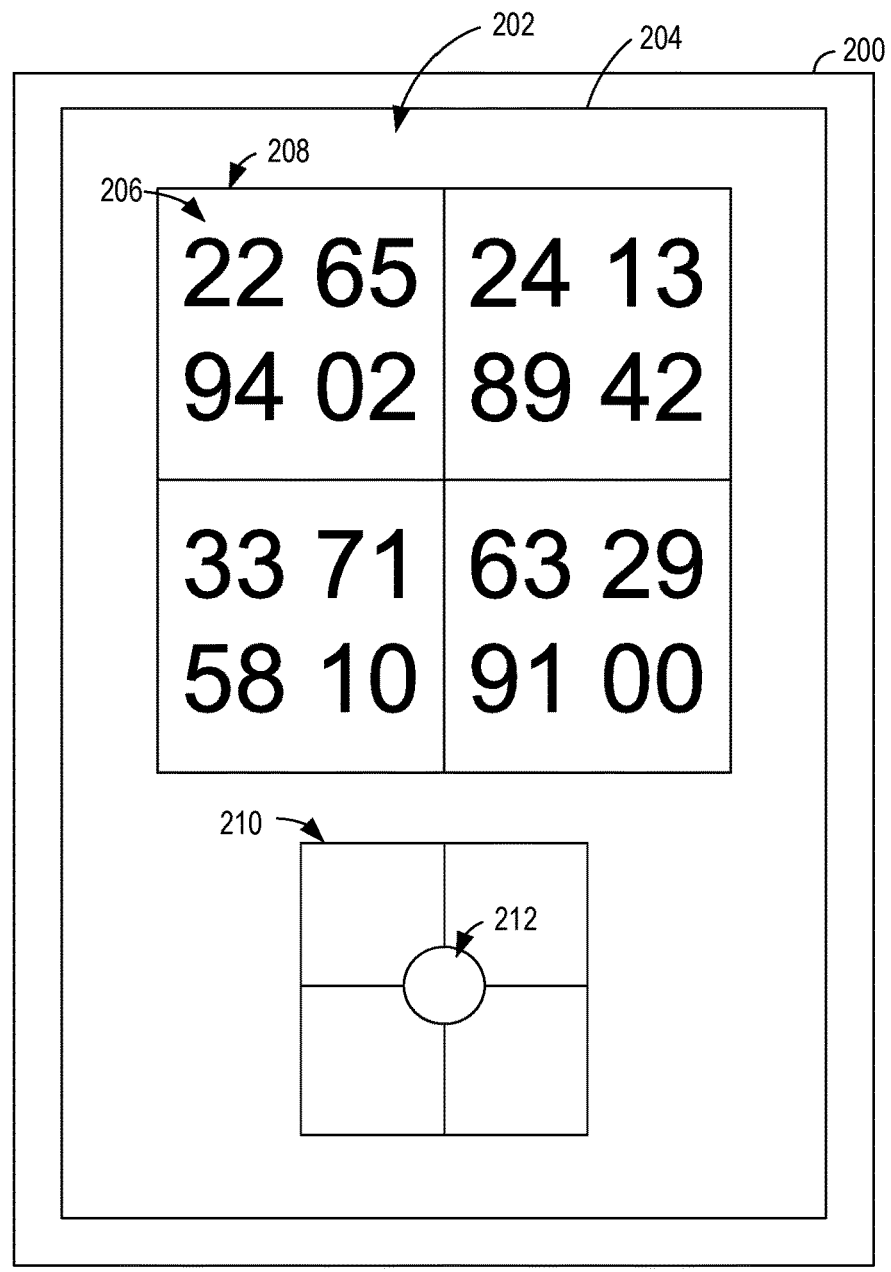
FIGS. 2A-2C schematically show an example computing device presenting different rounds of a device access control routine in accordance with one or more embodiments of the present disclosure.

FIG. 2A schematically shows an example device 200 to which a user may wish to gain access. In order to prevent unauthorized users from gaining access to the device 200, a user interface 202 may be presented on display 204 of the device. The user interface 202 may be generated and/or controlled using instructions stored in a memory or other storage device of the device and executed by a processor of the device. The user interface 202 may be presented upon powering up the device or otherwise toggling a display of the device "on" in some examples. In other examples, the user interface 202 (e.g., an initial or early stage of a device access control routine) may be displayed responsive to execution of an application, navigation to a secure webpage, and/or any other activity related to an attempt to access a secured component.

As illustrated in FIG. 2A, the user interface 202 includes a plurality of candidate authentication objects (in this example, numbers) 206, separated into a plurality of candidate regions 208 of the user interface and display. The candidate authentication objects may include characters such as text and/or numbers, symbols, shapes, patterns, images, animated objects, and/or any other displayable object that may be distinguished from other displayable objects. The displayed candidate authentication objects may be selected (e.g., randomly and/or based on an automated selection function) for display in the device access control routine from a list of possible authentication objects. For example, the list of possible authentication objects may include the numbers 00 through 99 in the illustrated examples. At some point prior to the time at which a device access control routine is initiated (e.g., prior to the display of the candidate authentication objects in the user interface 202 illustrated in FIG. 2A), an authorized user may select a plurality of authentication objects from the list of possible authentication objects in order to generate a device access code. In some examples, the plurality of authentication objects in the device access code (referred to herein as code objects) and/or the plurality of candidate authentication objects displayed during the device access control routine (e.g., selected via the automatic selection described above) may only include authentication objects of the same type (e.g., alphanumeric characters, text-only characters, images, etc.) In other examples, the code objects of the device access code and/or the candidate authentication objects displayed during the device access control routine may include authentication objects of different types. Although the device access code is described above as being selected by a user, it is to be understood that in some examples, a device access code may be generated automatically, without input from the user to which the code is associated, assigned or otherwise associated with the user and/or device (e.g., stored in memory of the device), and presented to the user for later-performed device access control routines.

In the illustrated example, each candidate region 208 of the user interface that includes candidate authentication objects includes a plurality of candidate authentication objects and each region includes the same number (e.g., quantity) of candidate authentication objects (four). In additional or alternative examples, the regions may include different numbers of candidate authentication objects. For example, one region may include four candidate authentication objects, and another region may include two candidate authentication objects.

The user interface 202 further includes a region selection mechanism 210 that represents locations where a user may provide selection input to the device in order to select a corresponding region 208. The region selection mechanism 210 may provide additional security by providing a space and/or offset between the location of input and the region selected by that input (e.g., so that an onlooker may not be able to tell which region the user selected). For example, an upper right corner of the region selection mechanism 210 may be selected in order to indicate that a code authentication object is present in the candidate region 208 that is in the upper right corner relative to the other candidate regions. In other examples, alternative region selection mechanisms may be used, or a user may provide input directly to a targeted candidate region (e.g., via touch input applied to the display in a location where the targeted candidate region is displayed) in order to select that targeted candidate region. Although the illustrated example provides a region selection mechanism that is displayed as a part of user interface 202, it is to be understood that other example region selection mechanisms may be distinct from the user interface that presents the candidate regions (e.g., actuatable buttons on another region of the device 200, on an input device coupled to the device 200, and/or on a different device).

The user interface 202 further includes a "not present" selectable object 212. The "not present" selectable object may be selected when none of the candidate regions 208 include a code authentication object (or a next code authentication object, in examples where the device access code is input via the device access control routine in a defined order). In the illustrated example, the "not present" selectable object 212 is provided in a central region of the region selection mechanism 210, however in other examples, the "not present" selectable object may be separate from the region selection mechanism (e.g., presented in a different region of the user interface 202 than that illustrated) and/or the user interface 202 (e.g., provided as an actuatable button on another region of the device 200, on an input device coupled to the device 200, and/or on a different device).

Figure 2B:
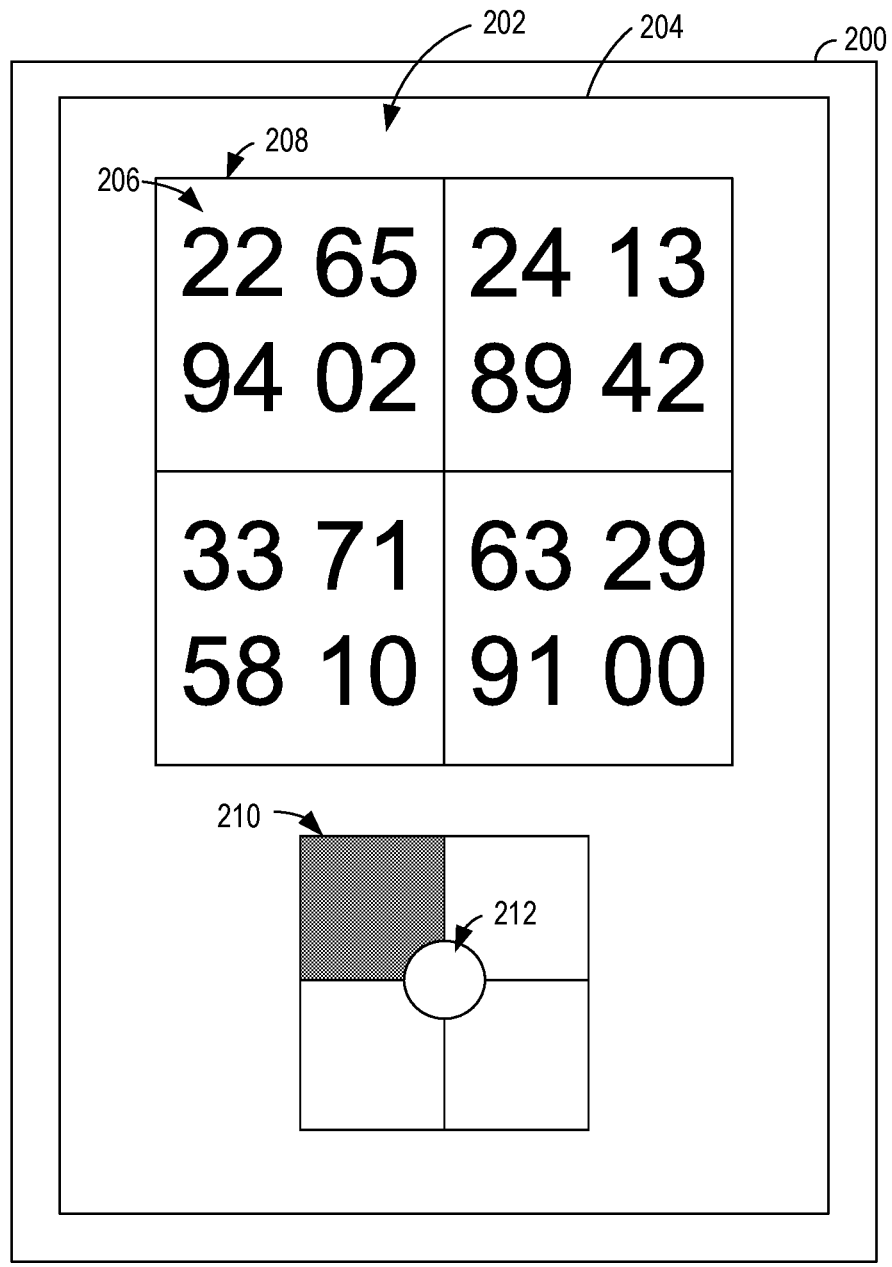

FIG. 2B shows a selection that may be made during a device access control routine in which a device access code includes the numbers "02" and "98." As shown in FIG. 2B, the code authentication object "02" is present in the region 208 positioned in the upper left relative to other regions. Accordingly, if the user knows the device access code, the user may select the corresponding upper left region of the region selection mechanism 210 to indicate a selection of the corresponding region 208. In such an example, the selection of the upper left region of the region selection mechanism 210 may be designated as a successful input and may be used to increment a success counter (e.g., a tracker for the number of correct inputs during a given device access control routine). Alternatively, if the user selects an area of the user interface representing a different one of the regions 208 or the "not present" selectable object, the input may be designated as an unsuccessful input and the success counter may not be incremented (and/or an unsuccessful counter may be incremented). The above-referenced counters will be discussed in more detail below with respect to FIG. 4A.

Figure 2C:
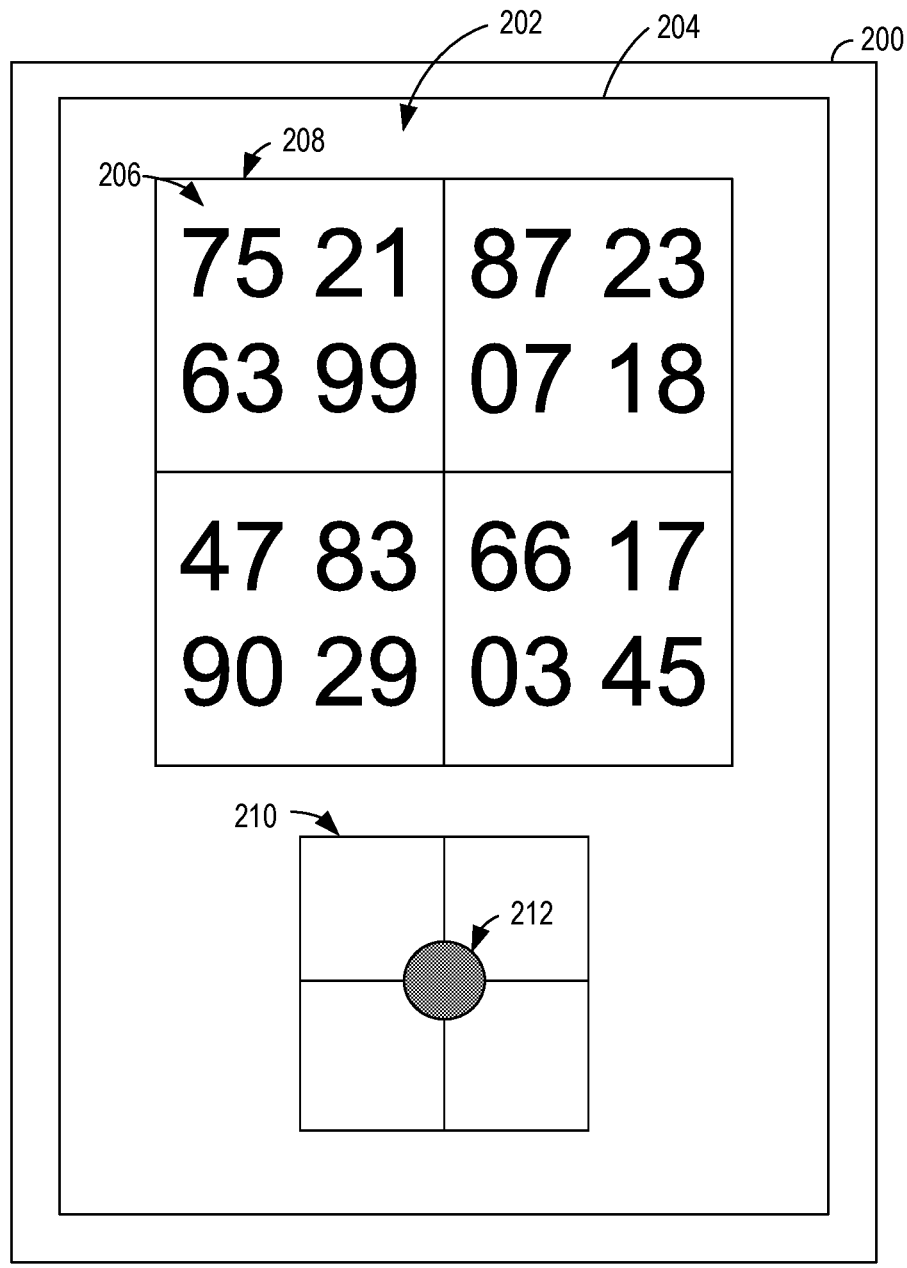

In response to the correct input (or in response to any input), the user interface 202 may be updated to display a next set of candidate authentication objects in each of the regions 208 (a result of which is illustrated in FIG. 2C) if a threshold number of rounds of the device access control routine have not been completed. If a threshold number of rounds of the device access control routine have been completed (e.g., if the user has provided input selecting regions/"not present" selectable objects a threshold number of times), the device access control routine may end. At the end of the routine, feedback may be provided to the user indicating whether the user is allowed access to the device based on the input received (e.g., based on a number of successful inputs). In some examples, feedback may only be provided to the user once the threshold number of rounds of the device access control routine have been completed. By not informing the user as to whether a given input at a given round is successful or unsuccessful, it may be harder for an unauthorized user to determine a device access code by guessing and observing feedback, thereby increasing security of the device access control routine. In other words, by withholding feedback (e.g., indicating that the user input a threshold number of incorrect selections) until all rounds have been completed, an unauthorized user may not know which selection(s) were incorrect/unsuccessful and which selection(s) were correct/successful.

As illustrated in FIG. 2C, none of the regions 208 include a code authentication object (e.g., neither "02" nor "98" is present in any of the regions). Accordingly, a user may select the "not present" selectable object 212 in order to indicate that none of the code authentication objects are shown in the regions 208. In such an example, the selection of the "not present" selectable object 212 may be designated as a successful input and may be used to increment a success counter (e.g., a tracker for the number of correct inputs during a given device access control routine). Alternatively, if the user selects an area of the user interface representing one of the regions 208, the input may be designated as an unsuccessful input and the success counter may not be incremented (and/or an unsuccessful counter may be incremented). Once again, if a threshold number of rounds have been completed, the device access control may end, and a user may be granted or denied access to the device based on the inputs received during the routine. If a threshold number of rounds have not been completed, the user interface 202 may once again be updated to display a next set of candidate authentication objects in each of the regions 208. The cycle of updating the user interface and accepting user input may repeat until the threshold number of rounds (e.g., cycles of updating the display and accepting user input) have been completed.

Figure 3:
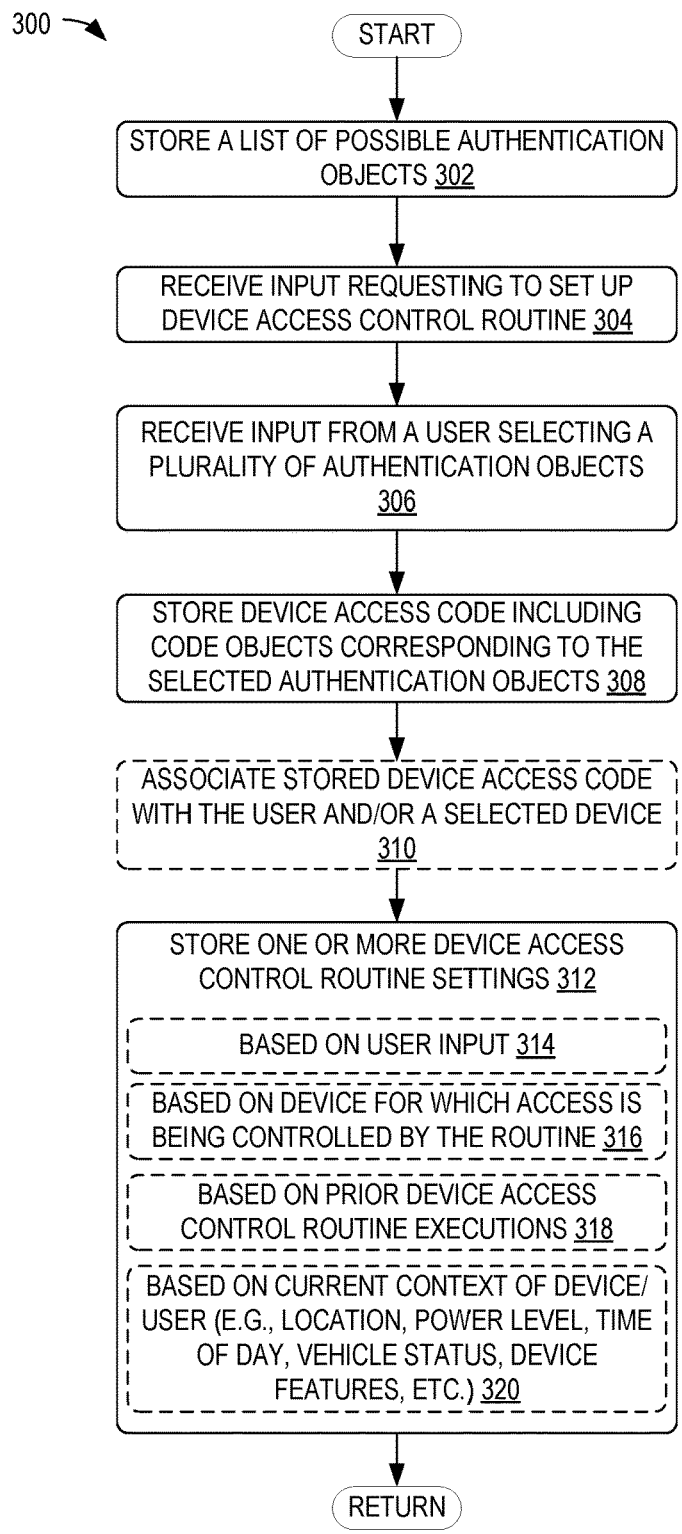
FIG. 3 is a flow chart of an example method of setting up a device access code and device access control routine in accordance with one or more embodiments of the present disclosure.

FIG. 3 shows a flow chart for an example method 300 of generating a device access code and setting up a device access control routine. At 302, the method includes storing a list of possible authentication objects. For example, the possible authentication objects from the above-described example of FIGS. 2A-2C may include all integers from 00 to 99. In other examples, the list of possible authentication objects may include a different object type (e.g., graphical symbols), a different quantity of objects (e.g., 500 total objects), and/or a mixture of object types (e.g., text and graphical symbols). This list of possible authentication objects may be used as a bank from which candidate authentication objects (e.g., the objects presented during each round of the device access control routine) are selected. The list of possible authentication objects may be stored at the device for which access is being controlled, the device performing the method 300, and/or a third-party device or service, such as a centralized security server.

At 304, the method includes receiving input (e.g., from a user) requesting to set up a device access control routine. For example, a user may navigate to a security settings application or menu option on the device for which access is being controlled via the device access control routine. In other examples, the input requesting to set up a device access control routine may include an initial start-up of the device for which access is being controlled (e.g., a first time powering on the device since the device was manufactured and/or last reset and/or a first time powering on the device after a hardware or software update or upgrade).

At 306, the method includes receiving input from a user selecting a plurality of authentication objects. In some examples, the list of possible authentication objects stored at 302 may be presented to the user, such that the user selects authentication objects from the list. In other examples, the user may directly enter the authentication objects without viewing the list of possible authentication objects. For example, a user may be informed of the bounds of the list of possible authentication objects (e.g., prompted to pick one or more integers ranging from 00 to 99) and/or may be presented with an error message if an invalid authentication object (e.g., an object that is not in the list of possible authentication objects) is not entered. In still other examples, the storage of possible authentication objects may occur after receiving input from the user selecting a plurality of authentication objects for a device access code. In such examples, the list of possible authentication objects may be generated based on the user's selection of authentication objects for the device access code (e.g., if the user enters only two-digit numbers, the list may be automatically generated to include all possible two-digit numbers). In such examples, the list of possible authentication objects may be generated to include the authentication objects selected by the user in addition to, for each type of authentication object selected by the user, a plurality of other authentication objects of the same type. In this way, the list of possible authentication objects is larger than the device access code.

At 308, the method includes storing the device access code including code objects corresponding to the selected authentication objects. For example, the device access code may only include the authentication objects selected at 306 (and/or authentication objects selected by the user during an earlier device access control routine setup), such that each code object of the device access code is a different one of the authentication objects selected at 306 (and/or selected during the earlier device access control routine setup). The device access code may be stored at the device for which access is being controlled, the device performing the method 300, and/or a third-party device or service, such as a centralized security server.

At 310, the method optionally includes associating the stored device access code with the user and/or a selected device. For example, a user may use the same device access code across multiple devices. By associating the stored device access code with the user, the user may utilize the device access code for accessing multiple devices even if the device access code is not input during a device access control routine setup on each of the multiple devices. The association of the device access code with a user may include storing the device access code along with an indicator that the device access code is associated with a user identifier, such as a user name, biometric parameter (e.g., fingerprint, eye scan, etc.), user face (e.g., based on facial recognition), and/or other parameter associated with the user. By associating the stored device access code with a selected device, the device access control routine setup may be performed on a different device than the device for which access is being controlled. The association of the device access code with the selected device may include storing the device access code along with an indicator that the device access code is associated with a device identifier, such as a media access control (MAC) address, serial number, device name, and/or other device ID. The association of the stored device access code with the user and/or selected device may be stored at the device for which access is being controlled, the device performing the method 300, and/or a third-party device or service, such as a centralized security server.

At 312, the method includes storing one or more device access control routine settings. The device access control routine settings may be stored at the device for which access is being controlled, the device performing the method 300, and/or a third-party device or service, such as a centralized security server. The device access control routine settings may include parameters for the device access control routine, including success (e.g., device access granted) conditions, device access denial conditions, display parameters for the user interface during the device access control routine, user input parameters for receiving user selection of authentication objects, routine parameters, and/or other settings for customizing the device access control routine.

Example success conditions may include a number or percentage of correct (e.g., successful) user selections (e.g., where the user selects candidate authentication objects that match a device access code and/or the user selects a "not present" selection object when no code objects are displayed), a number of correct user selections in a row, definitions of "correct user selections" (e.g., whether a user is to enter the device access code in order), etc. Example device access denial conditions may include a number and/or percentage of incorrect (e.g., unsuccessful) user selections (e.g., where the user selects candidate authentication objects that do not match a device access code and/or the user selects a "not present" selection object when code objects are displayed), a number of incorrect user selections in a row, etc. Example display parameters for the user interface may include a number of selectable regions, features of a region selection mechanism used to select the regions, a number of candidate authentication objects in each selectable region, overall appearance and/or layout of the user interface (e.g., text/object size/placement, colors, fonts, etc.). Example user input parameters for receiving user selection of authentication objects may include a type of user input that may be provided to select authentication objects (e.g., touch input, sliding/multi-touch input, button actuation, voice input, etc.), whether user input is provided directly to a selectable region or to a region selection mechanism, etc. Examples of routine parameters may include a threshold number of rounds (e.g., where a round includes a display of candidate authentication objects in a plurality of regions, and a receipt of user input selecting one of the regions, such that a number of rounds may be equal to the number of times the user provides input selecting a region and/or the number of times the display is updated to show different candidate authentication objects), whether a round may include not displaying any of the code objects, whether device access control routine settings may be changed dynamically during performance of the device access control routine (and which/how settings may be changed), etc.

As indicated at 314, the device access control routine settings may be based on user input (e.g., via one or more menu options enabling a user to provide input selecting desired settings). The device access control routine settings may additionally or alternatively be initialized and/or set based on features of the device for which access is being controlled, as indicated at 316. For example, the number and/or size of selectable regions may scale with a size of the display of the device for which access is being controlled (e.g., for a smart phone with a 5" display, four regions each having four candidate authentication objects may be presented during the device access control routine, whereas for a tablet with a 10" display, eight regions each having eight candidate authentication objects may be presented). The scale may be linear (e.g., rounding to the nearest whole number of candidate authentication objects and/or number of regions and/or rounding to the nearest factor of two candidate authentication objects and/or number of regions), exponential, and/or follow any other suitable curve (e.g., a bell curve).

As indicated at 318, the device access control routine settings may additionally or alternatively be based on prior device access control routine executions. For example, a number of rounds of the routine may increase or decrease as the number of successful device accesses (e.g., where the user is allowed access to the device after performing a device access control routine) increases or decreases. As indicated at 320, the device access control routine settings may additionally or alternatively be based on a current context of the device and/or user, such as the device/user's location, the device's power level, the time of day, the vehicle status (e.g., whether the vehicle is idling, turned off, driving in a city or on a highway, etc., when the device is in the vehicle), device features (e.g., screen size, input mechanisms, memory size, etc.), and/or other contexts. The current context of the device and/or user may be determined based on data received from a sensor communicatively coupled to the device (e.g., installed in a vehicle, installed in the device, and/or installed in or mounted on another device that is in communication with the device and/or vehicle. For example, while a vehicle is moving (e.g., when a speed of the vehicle is above a threshold, as determined by data from a sensor of the vehicle and/or device), the device access control routine may be modified to present fewer rounds and display larger candidate objects than when the vehicle is stationary, in order to reduce cognitive load and increase speed of access. In some examples, the threshold number of rounds, a number of candidate regions displayed in the user interface, and a number of candidate authentication objects displayed in each candidate region may be dynamically adjusted based on a speed of the vehicle. For example, different ranges of speed may be associated with different numbers of rounds, candidate regions displayed, etc. In this way, the device access control routine settings may be dynamically altered during performance of the routine and/or at a time of starting the routine.

Figure 4A:
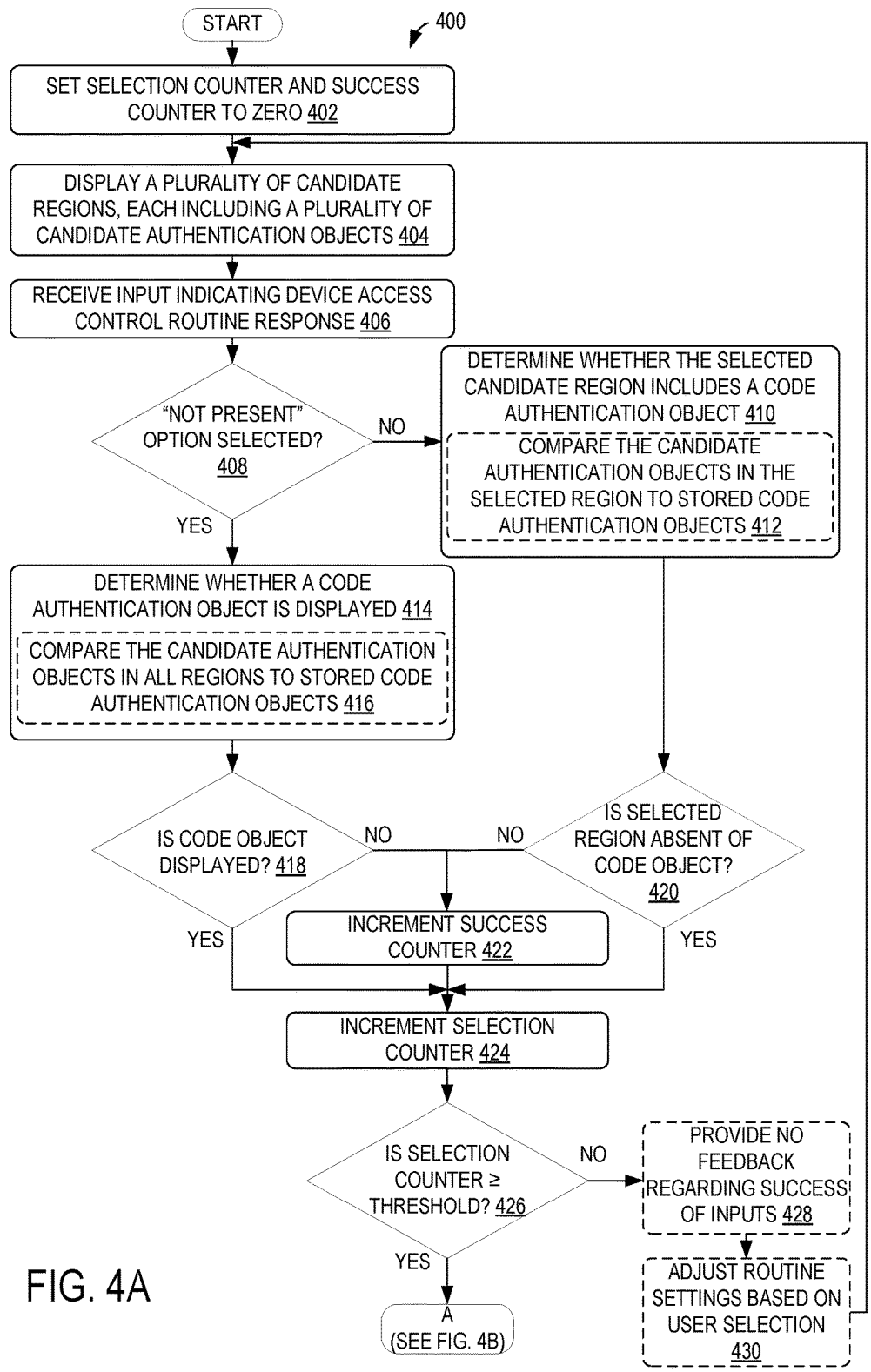
FIGS. 4A and 4B are flow charts of an example method of performing a device access control routine in accordance with one or more embodiments of the present disclosure.
Figure 4B:
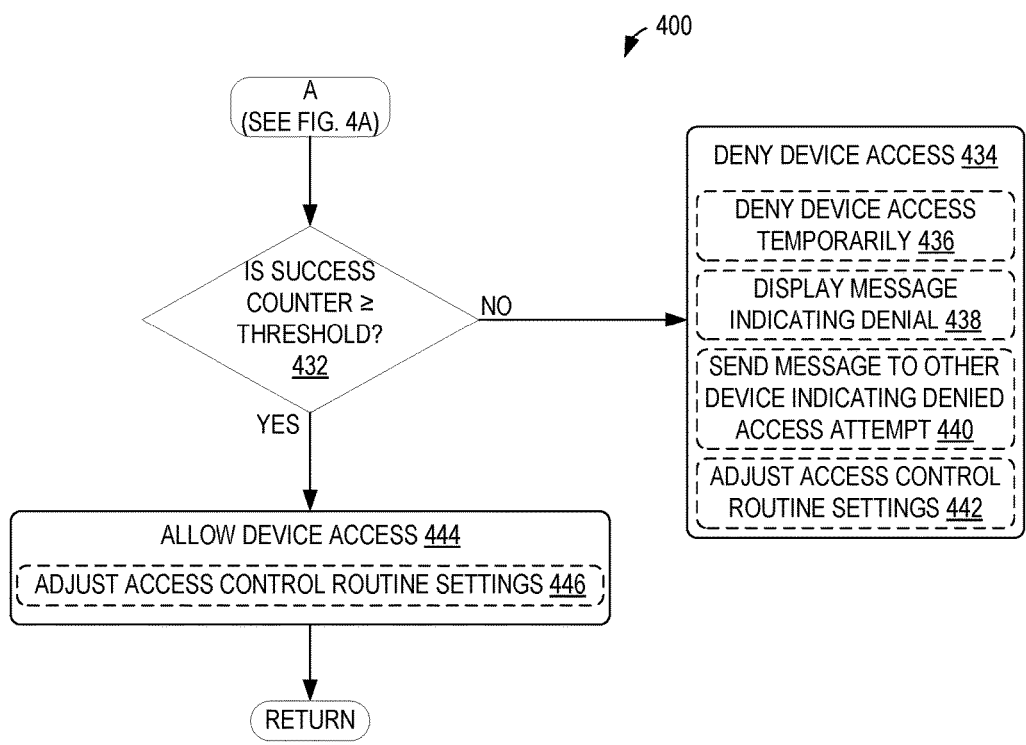

FIGS. 4A and 4B show example flow charts for a method 400 of performing a device access control routine. For example, method 400 may be performed by a device for which access is being requested (e.g., a device being awoken from a sleep, hibernate, or shut down state) and/or a device configured to control a device for which access is being requested. At 402, the method includes setting a selection counter and a success counter to zero. As will be discussed further below, the selection counter may be used to track a number of selection inputs provided by a user during the device access control routine, and thus may indicate a number of rounds of the routine that have been completed. The success counter may be used to track a number of correct (successful) selection inputs received during the device access routine, which may be used to determine whether or not to provide the user access to the device. Although described herein as setting the counters to zero at the start of the routine, it is to be understood that the counters may be reset to any starting value, as long as the starting value is compensated for when evaluating the counters (example evaluations are described below).

At 404, the method includes displaying a plurality of candidate regions, each region including a plurality of candidate authentication objects. The regions 208 of FIGS. 2A-2C are examples of candidate regions that may be displayed at 404. At 406, the method includes receiving input indicating a device access control routine response. The device access control routine response may include a selection of a candidate region (e.g., a direct selection of a candidate region or a selection of a user interface object that represents the candidate region) or a selection of a "not present" option (e.g., "not present" selectable object 212 of FIGS. 2A-2C). Accordingly, at 408, the method includes determining if the "not present" option was selected at 406. If the "not present" option was not selected (e.g., "NO" at 408), then the user selected a candidate region, and the method proceeds to 410 to determine whether the selected candidate region includes a code authentication object (e.g., an authentication object within a device access code, such as the device access code generated via method 300 of FIG. 3). For example, as indicated at 412, the method may include comparing the candidate authentication objects in the selected candidate region to stored code authentication objects of the device access code in order to determine any overlap (e.g., to determine whether a stored code object is displayed in the selected candidate region). Returning briefly to 408, if the "not present" option was selected at 406 (e.g., "YES" at 408), the method proceeds to 414 to determine whether a code authentication object is displayed in any of the candidate regions. As indicated at 416, the method may include comparing the candidate authentication objects in all regions to stored code authentication objects in order to determine any overlap (e.g., to determine whether a stored code object is displayed in any of the candidate regions).

The determinations at 410 and 414 may indicate whether a user correctly (e.g., successfully) identified an access code object (or an absence of access code objects) in a candidate region(s). Accordingly, if the user provided a successful/correct input (e.g., the user selected the "not present" option at 406 and at 418 the code object is determined to have not been displayed ("NO" at 418) OR the user selected a candidate region at 406 and at 420 the selected region is not absent of a code object ("NO" at 420)), the method proceeds to 422 to increment the success counter. The method further includes incrementing the selection counter at 424 in order to register the completion of another round of the routine.

If the user provided an unsuccessful/incorrect input (e.g., the user selected the "not present" option at 406 and at 418 the code object is determined to have been displayed ("YES" at 418) OR the user selected a candidate region at 406 and at 420 the selected region is absent of a code object ("YES" at 420, where the selected region does not include any of the code objects)), the method bypasses 422 (e.g., does not increment the success counter) to increment the selection counter at 424.

At 426, the method includes determining whether the selection counter is greater than or equal to a threshold. The threshold may indicate (e.g., equal) a number of rounds of the routine that are to be completed before evaluating whether the selection inputs of the user enable the user to access the device. Accordingly, if the value of the selection counter is not above or equal to the threshold (e.g., if the value of the selection counter is below the threshold, the method optionally proceeds to 428 to not provide feedback regarding success of inputs (e.g., to avoid informing unauthorized users of which selection was unsuccessful).

The method may additionally or alternatively optionally proceed to 430 to adjust the device access routine based on user selections (e.g., the user response to the displayed candidate authentication objects). For example, routine parameters such as the amount of candidate authentication objects displayed, the amount of candidate authentication objects displayed per candidate region, the amount of regions, the number of code objects displayed, the number of rounds to be completed (e.g., the threshold that is evaluated at 426), etc. may be adjusted responsive to the user providing a correct/successful response (e.g., the "NO" branches of 418 and 420) or an incorrect/unsuccessful response (e.g., the "YES" branches of 418 and 420). For example, if the user provided an incorrect response (e.g., "NO" at 418 or 420), the threshold evaluated at 426 may be increased (e.g., up to a maximum number) in order to increase the number of rounds that are to be completed before device access is potentially granted.

Figure 5A:
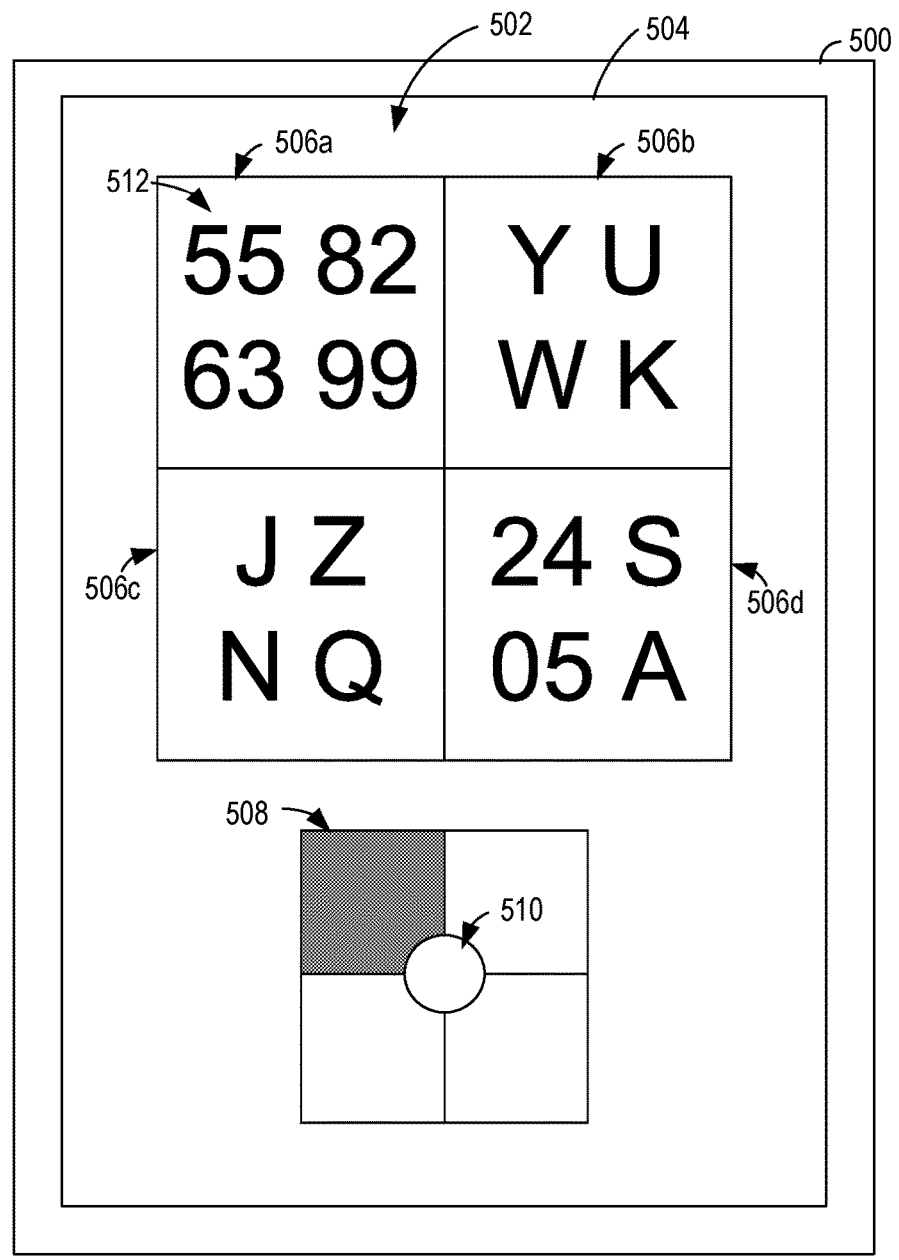
FIGS. 5A and 5B schematically show an example computing device updating parameters of a device access control routine responsive to user selections during the routine in accordance with one or more embodiments of the present disclosure.
Figure 5B:
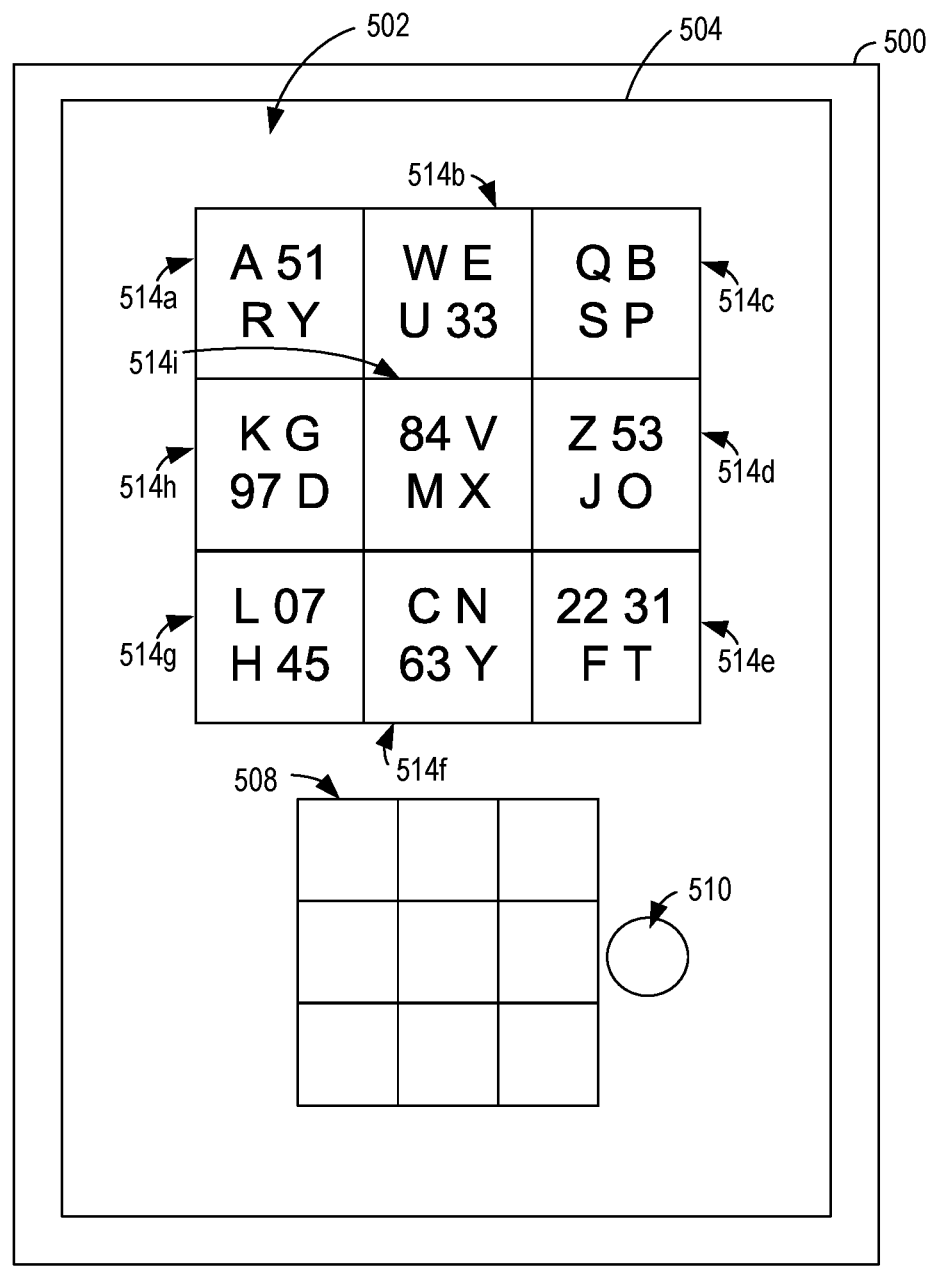

Another example of routine parameter adjustments is illustrated in FIGS. 5A and 5B. FIG. 5A shows a device 500 presenting a user interface 502 via a display 504. The user interface 502 may be generated and/or controlled using instructions stored in a memory or other storage device of device 500 executed by a processor of device 500. For example, device 500 may be the in-vehicle computing system 109 of FIG. 1, the mobile device 128 of FIG. 1, the device 200 of FIGS. 2A-2C, and/or any other device to which access is controlled (e.g., via method 400 of FIGS. 4A and 4B). In the example of FIG. 5A, the user interface 502 includes four candidate regions 506a, 506b, 506c, and 506d. The user interface 502 also includes a region selection mechanism 508 and a "not present" selectable option 510. In the illustrated example, each of the candidate regions include four candidate authentication objects 512, which are of mixed types (e.g., two-digit integers and single letters). An example access code may include the objects "A," "04," "E," and "97." In other examples, the candidate authentication objects may include one or more object types (e.g., text objects, numerical objects, graphical objects, symbol objects, etc.) that are not included in the device access code. For example, if the device access code includes letters and numerals, the candidate authentication objects may include letters, numerals, and graphical objects.

In response to an input selecting the candidate region 506a, which does not include any of the objects in the example access code, the user interface 502 may be updated as shown in FIG. 5B. In FIG. 5B, the user interface 502 is updated to display a new set of candidate regions 514a-514i, each including four candidate authentication objects. The candidate regions displayed responsive to the incorrect selection thus increased from four to nine. An updated region selection mechanism 508 is also displayed, including input areas corresponding to each of the candidate regions 514a-514i, and the "not present" selectable option 510 is shifted to accommodate the new layout of the region selection mechanism. In some examples, to avoid indicating to a user which response was incorrect/unsuccessful, the routine parameters may be changed after a predetermined number of selections (e.g., 2 rounds of the routine) in which at least one of the selections was incorrect/unsuccessful. In this way, the difficulty of guessing the access code may be increased without providing direct feedback of which selection was incorrect/unsuccessful.

Returning to FIG. 4A, after optionally adjusting routine settings/parameters, the method then returns to 404 to display an updated set of candidate regions. The updated set of candidate regions may include at least one different candidate authentication object than was displayed in a prior round, and may include all different candidate authentication objects.

If the selection counter is greater than or equal to the threshold (e.g., "YES" at 426), the method proceeds to 432, illustrated in FIG. 4B, to determine whether the value of the success counter is greater than or equal to a threshold. The threshold evaluated at 432 may be the same or different from the threshold evaluated at 426. For example, if the threshold evaluated at 432 and 426 are the same, the device may only grant access when the user provides correct/successful selections (e.g., the "NO" branches of 418 and 420) in every round of the device access control routine. If the threshold evaluated at 432 is less than the threshold evaluated at 426, the user may be allowed to make a quantity of incorrect/unsuccessful selections (e.g., the "YES" branches of 418 and 420) that equals the difference between the two thresholds.

If the success counter is not greater than or equal to the threshold (e.g., the success counter is less than the threshold, "NO" at 432), the method proceeds to 434 to deny device access to the user. In some examples, the access denial may be temporary, as indicated at 436. For example, the device may deny access until a device access control routine is successfully completed (e.g., where the success counter is greater than or equal to the threshold) and/or may a waiting period before allowing a user to retry the device access control routine. The waiting period may increase with the number (e.g., cumulative or successive) of unsuccessful device access control routine completions (e.g., where the user is not granted access to the device). The waiting period may decrease (e.g., to a minimum value) with the number (e.g., cumulative or successive) of successful device access control routine completions (e.g., where the user is granted access to the device).

As indicated at 438, the access denial may include displaying a message indicating the denial. In some examples, a hint or indication of the reason for the denial may be presented in the message (e.g., informing the user of a number of wrong selections, or reminding the user that the selections must be received in an order corresponding to the order of the code objects). The information included in the message may change based on a number (e.g., cumulative or successive) of successful and/or unsuccessful attempts for device access. At 440, the method may include sending a message to another device (e.g., belonging to a primary user of the device for which access was just attempted via the access control routine 400) indicating that an unsuccessful access attempt was detected. At 442, the method may include adjusting access control routine settings (e.g., the settings described above with respect to FIG. 3). For example, responsive to a number of successful or unsuccessful attempts to access the device, the number of rounds of the device access control routine to be completed before granting access to the device may be increased or decreased.

If the success counter is greater than or equal to the threshold (e.g., "YES" at 432), the method proceeds to 444 to allow device access to the user that passed the test (e.g., successfully completed the routine). For example, device access may enable the authorized user to provide input via an increased amount of input devices, to provide input to a particular application or set of applications, to run an operating system, and/or to otherwise have more control over the operation of the device than prior to completing the device access control routine. As indicated at 446, allowing device access may further include adjusting access control routine settings. Allowing access to the device may include transitioning the device from a first state to a second state, where one or more actions and/or one or more user interfaces that are accessible by the user in the second state are not accessible by the user in the first state. For example, in a first state, the device may be able to provide selected phone calls (e.g., to an emergency service), but may not be able to display an application/operating system home screen, execute an application, and/or accept user input (other than user input to initiate the device access control routine, user input received during the device access control routine, and/or user input to make the selected phone calls). In the second state, additional applications, user interfaces, and/or control mechanisms may be made available to a user (e.g., a user may be able to view an application/operating system home screen and execute an application that was not available for execution in the first state, etc.).

Although the above-described example utilizes a success counter to keep track of correct/successful responses during the device access control routine, it is to be understood that other approaches may be taken to determine whether a user is able to access the device after completing the device access control routine. For example, if the user is only allowed to access the device if a correct response is provided during every round of the device access control routine, the device may use a flag or other binary component that is set when an incorrect/unsuccessful response is provided. Upon completion of all rounds of the routine, the flag may be analyzed to determine whether the user provided an incorrect/unsuccessful response and, if so, the user may be denied access (or vice versa: the user may be allowed access if the flag is not set or otherwise indicates that the user did not provide an incorrect/unsuccessful response during the routine). Still other examples include tracking incorrect/unsuccessful responses instead of or in addition to the success counter. In any of these examples, the user may be allowed or denied access according to the access control settings for the device (e.g., set as described with respect to method 300 and/or dynamically updated as described with respect to FIGS. 4A and 4B.

The above-described systems and methods also provide for a computing device to which access is controlled by a device access code including a plurality of device access code objects, the computing device comprising a display device for presenting a user interface, a processor, and a storage device storing instructions executable by the processor to, for each of a threshold number of rounds, display a plurality of candidate regions on the user interface, each candidate region including a plurality of candidate authentication objects, receive input indicating a device access control response, and, if the input includes selection of a first candidate region of the plurality of candidate regions, determine that the input is a successful input responsive to determining that the first candidate region includes one of the plurality of device access code objects, and, after performing the threshold number of rounds, selectively allow access to the device based on a number of rounds that included a successful input. In a first example, the instructions are additionally or alternatively further executable to allow access to the device when the number of rounds that include a successful input is equal to the threshold number of rounds. A second example optionally includes the first example, and further includes the computing device, wherein allowing access to the device includes transitioning the device from a first state to a second state, where one or more actions and/or one or more user interfaces that are accessible by the user in the second state are not accessible by the user in the first state. A third example optionally includes one or both of the first and the second examples, and further includes the computing device, wherein the instructions are further executable to determine that the input is a successful input responsive to determining that none of the plurality of candidate regions includes one of the plurality of device access code objects if the input includes selection of a user interface object representing none of the candidate regions. A fourth example optionally includes one or more of the first through the third examples, and further includes the computing device, wherein the instructions are further executable to adjust device access control routine settings dynamically while performing the threshold number of rounds based on whether the input is determined to be a successful input. A fifth example optionally includes one or more of the first through the fourth examples, and further includes the computing device, wherein the device access control routine settings that are dynamically adjusted include one or more of the threshold number of rounds, a number of candidate regions displayed in the user interface, and a number of candidate authentication objects displayed in each candidate region. A sixth example optionally includes one or more of the first through the fifth examples, and further includes the computing device, wherein the instructions are further executable to determine that the input is an unsuccessful input responsive to determining that the first candidate region does not include any of the plurality of device access code objects when the input is a selection of the first candidate region, or determining that at least one candidate region includes at least one of the plurality of device access code objects when the input is a selection of the user interface object representing none of the candidate regions. A seventh example optionally includes one or more of the first through the sixth examples, and further includes the computing device, wherein dynamically adjusting the device access control routine settings includes one or more of increasing the threshold number of rounds and increasing the number of candidate regions displayed in the user interface responsive to determining that the input is an unsuccessful input. An eighth example optionally includes one or more of the first through the seventh examples, and further includes the computing device, wherein receiving the input including selection of a candidate region includes receiving input provided to a region selection mechanism offset from the candidate region. A ninth example optionally includes one or more of the first through the eighth examples, and further includes the computing device, wherein the plurality of device access code objects are selected by a user prior to displaying the plurality of candidate regions, and wherein the plurality of device access code objects include one or more types of objects, the types of objects including text objects, numerical objects, graphical objects, and symbol objects. A tenth example optionally includes one or more of the first through the ninth examples, and further includes the computing device, wherein the plurality of candidate authentication objects include at least one type of object that is not included in the plurality of device access code objects.

The above-described systems and methods also provide for a method of controlling access to a computing device using a device access control code including a plurality of device access code objects, the method including for each of a plurality of rounds, displaying a plurality of candidate regions on the user interface, each candidate region including a plurality of candidate authentication objects, receiving input indicating a device access control response, the input including selection of one or more of a candidate region and user interface object representing none of the candidate regions, if the input includes selection of a first candidate region of the plurality of candidate regions, determining that the input is a successful input responsive to determining that the first candidate region includes one of the plurality of device access code objects, and if the input includes selection of the user interface object representing none of the candidate regions, determining that the input is a successful input responsive to determining that none of the plurality of candidate regions includes one of the plurality of device access code objects, and, after performing the threshold number of rounds, selectively allowing access to the device based on a number of rounds that included a successful input. In a first example, the method additionally or alternatively further comprises allowing access to the device when the number of rounds that include a successful input is equal to the threshold number of rounds. A second example of the method optionally includes the first example, and further includes the method, further comprising initializing one or more device access control routine settings based on one or more of device features of the computing device, user input, data received from a sensor communicatively coupled to the computing device, and a location of the computing device. A third example of the method optionally includes one or both of the first and the second examples, and further includes the method, wherein the one or more device access control routine settings includes one or more of the threshold number of rounds, a number of candidate regions displayed in the user interface, and a number of candidate authentication objects displayed in each candidate region, and the method further comprising dynamically adjusting the one or more device access control routine settings based on whether the input is determined to be a successful input. A fourth example of the method optionally includes one or more of the first through the third examples, and further includes the method, wherein the computing device is located in a vehicle, and wherein one or more of the threshold number of rounds, a number of candidate regions displayed in the user interface, and a number of candidate authentication objects displayed in each candidate region is dynamically adjusted based on a speed of the vehicle.

The above-described systems and methods also provide for a computing device to which access is controlled by a device access code including a plurality of device access code objects, the computing device comprising a display device for presenting a user interface, a processor, and a storage device storing instructions executable by the processor to, for each of a threshold number of rounds, display a plurality of candidate regions on the user interface, each candidate region including a plurality of candidate authentication objects, receive input indicating a device access control response, the input including selection of one or more of a candidate region and user interface object representing none of the candidate regions, if the input includes selection of a first candidate region of the plurality of candidate regions: determine that the input is a successful input responsive to determining that the first candidate region includes one of the plurality of device access code objects, and otherwise determine that the input is an unsuccessful input, if the input includes selection of the user interface object representing none of the candidate regions: determine that the input is a successful input responsive to determining that none of the plurality of candidate regions includes one of the plurality of device access code objects, and otherwise determine that the input is an unsuccessful input, and adjust one or more device access control routine settings responsive to determining that the input is an unsuccessful input, and, after performing the threshold number of rounds, selectively allow access to the device based on a number of rounds that included a successful input. In a first example, the instructions are additionally or alternatively further executable to allow access to the device when the number of rounds that include a successful input is equal to the threshold number of rounds. A second example of the computing device optionally includes the first example, and further includes the computing device, wherein the one or more device access control routine settings includes one or more of the threshold number of rounds, a number of candidate regions displayed in the user interface, and a number of candidate authentication objects displayed in each candidate region. A third example of the computing device optionally includes one or both of the first and the second examples, and further includes the computing device, wherein adjusting the one or more device access control routine settings includes one or more of increasing the threshold number of rounds and increasing the number of candidate regions displayed in the user interface responsive to determining that the input is an unsuccessful input.

The above-described methods and systems provide device access control that may prevent onlookers from quickly learning a user's access code via observation, thereby having the technical effect of increasing security while leveraging existing hardware and maintaining ease of use while inputting the access code. The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices, such as the in-vehicle computing system 109, mobile device 128, mobile device 200, and/or device 500 described with reference to FIGS. 1, 2A-2C, 5A, and 5B. The methods may be performed by executing stored instructions with one or more logic devices (e.g., processors) in combination with one or more additional hardware elements, such as storage devices, memory, hardware network interfaces/antennas, switches, actuators, clock circuits, etc. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and sub-combinations of the various systems and configurations, and other features, functions, and/or properties disclosed.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects. The following claims particularly point out subject matter from the above disclosure that is regarded as novel and non-obvious.

The invention claimed is:

1. A computing device to which access is controlled by a device access code including a plurality of device access code objects, the computing device comprising:
   a display device for presenting a user interface;
   a processor; and
   a storage device storing instructions executable by the processor to:
      for each of a threshold number of rounds:
         display a plurality of candidate regions on the user interface, each candidate region including a plurality of candidate authentication objects,
         receive input indicating a device access control response, and
         if the input includes selection of a first candidate region of the plurality of candidate regions, determine that the input is a successful input responsive to determining that the first candidate region includes one of the plurality of device access code objects; and
      after performing the threshold number of rounds, selectively allow access to the computing device based on a number of rounds that included a successful input, wherein the threshold number of rounds, a number of candidate regions displayed in the user interface, and/or a number of candidate authentication objects displayed in each candidate region is dynamically adjusted based on a location of the computing device and/or data received from a sensor of the computing device.

2. The computing device of claim 1, wherein the instructions are further executable to allow access to the computing device when the number of rounds that include a successful input is equal to the threshold number of rounds.

3. The computing device of claim 1, wherein allowing access to the computing device includes transitioning the computing device from a first state to a second state, where one or more actions and/or one or more user interfaces that are accessible by a user in the second state are not accessible by the user in the first state.

4. The computing device of claim 1, wherein the instructions are further executable to determine that the input is a successful input responsive to determining that none of the plurality of candidate regions includes one of the plurality of device access code objects if the input includes selection of a user interface object representing none of the candidate regions.

5. The computing device of claim 4, wherein the instructions are further executable to adjust device access control routine settings dynamically while performing the threshold number of rounds based on whether the input is determined to be a successful input.

6. The computing device of claim 5, wherein the device access control routine settings that are dynamically adjusted include the threshold number of rounds, the number of candidate regions displayed in the user interface, and/or the number of candidate authentication objects displayed in each candidate region.

7. The computing device of claim 5, wherein the instructions are further executable to determine that the input is an unsuccessful input responsive to:
   determining that the first candidate region does not include any of the plurality of device access code objects when the input is a selection of the first candidate region, or
   determining that at least one candidate region includes at least one of the plurality of device access code objects when the input is a selection of the user interface object representing none of the candidate regions.

8. The computing device of claim 7, wherein dynamically adjusting the device access control routine settings includes increasing the threshold number of rounds and/or increasing the number of candidate regions displayed in the user interface responsive to determining that the input is an unsuccessful input.

9. The computing device of claim 1, wherein receiving the input including selection of a candidate region includes receiving input provided to a region selection mechanism offset from the candidate region.

10. The computing device of claim 1, wherein the plurality of device access code objects are selected by a user prior to displaying the plurality of candidate regions, and wherein the plurality of device access code objects include one or more types of objects, the types of objects including text objects, numerical objects, graphical objects, and symbol objects.

11. The computing device of claim 10, wherein the plurality of candidate authentication objects includes at least one type of object that is not included in the plurality of device access code objects.

12. A method of controlling access to a computing device using a device access control code including a plurality of device access code objects, the method comprising:
   for each of a plurality of rounds:
      displaying a plurality of candidate regions on a user interface, each candidate region including a plurality of candidate authentication objects,
      receiving input indicating a device access control response, the input including selection of one or more of a candidate region and user interface object representing none of the candidate regions,
      if the input includes selection of a first candidate region of the plurality of candidate regions, determining that the input is a successful input responsive to determining that the first candidate region includes one of the plurality of device access code objects, and if the input includes selection of the user interface object representing none of the candidate regions, determining that the input is a successful input responsive to determining that none of the plurality of candidate regions includes one of the plurality of device access code objects; and after performing a threshold number of rounds, selectively allowing access to the computing device based on a number of rounds that included a successful input, wherein the computing device is located in a vehicle, and wherein the threshold number of rounds, a number of candidate regions displayed in the user interface, and/or a number of candidate authentication objects displayed in each candidate region is dynamically adjusted based on a parameter of the vehicle.

13. The method of claim 12, further comprising allowing access to the computing device when the number of rounds that include a successful input is equal to the threshold number of rounds.

14. The method of claim 12, further comprising initializing one or more device access control routine settings based on device features of the computing device, user input, data received from a sensor communicatively coupled to the computing device, and/or a location of the computing device.

15. The method of claim 14, wherein the one or more device access control routine settings includes the threshold number of rounds, a number of candidate regions displayed in the user interface, and/or a number of candidate authentication objects displayed in each candidate region, and the method further comprising dynamically adjusting the one or more device access control routine settings based on whether the input is determined to be a successful input.

16. The method of claim 14, wherein the parameter of the vehicle comprises a speed of the vehicle.

17. A computing device to which access is controlled by a device access code including a plurality of device access code objects, the computing device comprising:
a display device for presenting a user interface;
a processor; and
a storage device storing instructions executable by the processor to:

for each of a threshold number of rounds:
display a plurality of candidate regions on the user interface, each candidate region including a plurality of candidate authentication objects,
receive input indicating a device access control response, the input including selection of a candidate region and/or a user interface object representing none of the plurality of candidate regions,
if the input includes selection of a first candidate region of the plurality of candidate regions: determine that the input is a successful input responsive to determining that the first candidate region includes one of the plurality of device access code objects, and otherwise determine that the input is an unsuccessful input,
if the input includes selection of the user interface object representing none of the plurality of candidate regions: determine that the input is a successful input responsive to determining that none of the plurality of candidate regions includes one of the plurality of device access code objects, and otherwise determine that the input is an unsuccessful input, and
adjust one or more device access control routine settings responsive to determining that the input is an unsuccessful input, the one or more device access control routine settings including a number of candidate regions displayed in the user interface and/or a number of candidate authentication objects displayed in each candidate region; and
after performing the threshold number of rounds, selectively allow access to the computing device based on a number of rounds that included a successful input.

18. The computing device of claim 17, wherein the instructions are further executable to allow access to the computing device when the number of rounds that include a successful input is equal to the threshold number of rounds.

19. The computing device of claim 17, wherein the one or more device access control routine settings further includes the threshold number of rounds.

20. The computing device of claim 19, wherein adjusting the one or more device access control routine settings includes increasing the threshold number of rounds and/or increasing the number of candidate regions displayed in the user interface responsive to determining that the input is an unsuccessful input.

* * * * *